United States Patent
Kamei et al.

(10) Patent No.: US 8,241,401 B2
(45) Date of Patent: Aug. 14, 2012

(54) APPARATUS AND METHOD FOR PRODUCING PURIFIED HYDROGEN GAS BY A PRESSURE SWING ADSORPTION PROCESSES

(75) Inventors: Takeshi Kamei, Theodore, AL (US); Yasunari Takimoto, Yokkaichi (JP)

(73) Assignees: Mitsubishi Polycrystalline Silicon America Corporation (MIPSA), Theodore, AL (US); Mitsubishi Materials Corporation, Tokyo (JP)

( * ) Notice: Subject to any disclaimer, the term of this patent is extended or adjusted under 35 U.S.C. 154(b) by 52 days.

(21) Appl. No.: 12/917,875

(22) Filed: Nov. 2, 2010

(65) Prior Publication Data

US 2012/0107219 A1  May 3, 2012

(51) Int. Cl.
*B01D 59/26* (2006.01)
*B01D 47/00* (2006.01)
*B01D 53/02* (2006.01)
*C01B 33/02* (2006.01)
*C01B 3/02* (2006.01)

(52) U.S. Cl. ............ 95/96; 95/127; 423/350; 423/648.1

(58) Field of Classification Search ................... 423/235, 423/239.1, 240 R, 240 S, 245.1, 248, 262, 423/350, 648.1; 95/95–106, 127, 130, 142, 95/143

See application file for complete search history.

(56) References Cited

U.S. PATENT DOCUMENTS

| | | | |
|---|---|---|---|
| 3,703,068 A * | 11/1972 | Wagner | 95/11 |
| RE31,014 E * | 8/1982 | Sircar | 95/101 |
| 4,553,981 A * | 11/1985 | Fuderer | 48/62 R |
| 4,623,524 A * | 11/1986 | Someya et al. | 423/245.3 |
| 4,834,956 A * | 5/1989 | Agrawal et al. | 423/262 |
| 4,891,187 A * | 1/1990 | Jungfer et al. | 423/248 |
| 5,547,492 A * | 8/1996 | Cho et al. | 95/100 |
| 6,261,343 B1 | 7/2001 | Golden et al. | |
| 7,537,742 B2 * | 5/2009 | Baksh et al. | 423/230 |
| 7,785,550 B2 * | 8/2010 | Hofmann et al. | 423/219 |
| 2007/0204748 A1 | 9/2007 | Lomax et al. | |

FOREIGN PATENT DOCUMENTS

| | | |
|---|---|---|
| JP | 63-144110 A | 6/1988 |
| JP | 07-277720 A | 10/1995 |
| JP | 2001-058118 A | 3/2001 |

* cited by examiner

*Primary Examiner* — Stanley Silverman
*Assistant Examiner* — Anthony J Zimmer
(74) *Attorney, Agent, or Firm* — Edwards Wildman Palmer LLP

(57) ABSTRACT

The invention relates to a method and an apparatus for producing purified hydrogen gas by a pressure swing adsorption process. Further the invention relates to detecting an operating life of adsorbents in a adsorption tower. The method and the apparatus have a gas supply unit for adding an inert gas to an unpurified hydrogen gas and a detector for measuring an inert gas in a purified hydrogen gas discharged from the adsorption tower.

9 Claims, 3 Drawing Sheets

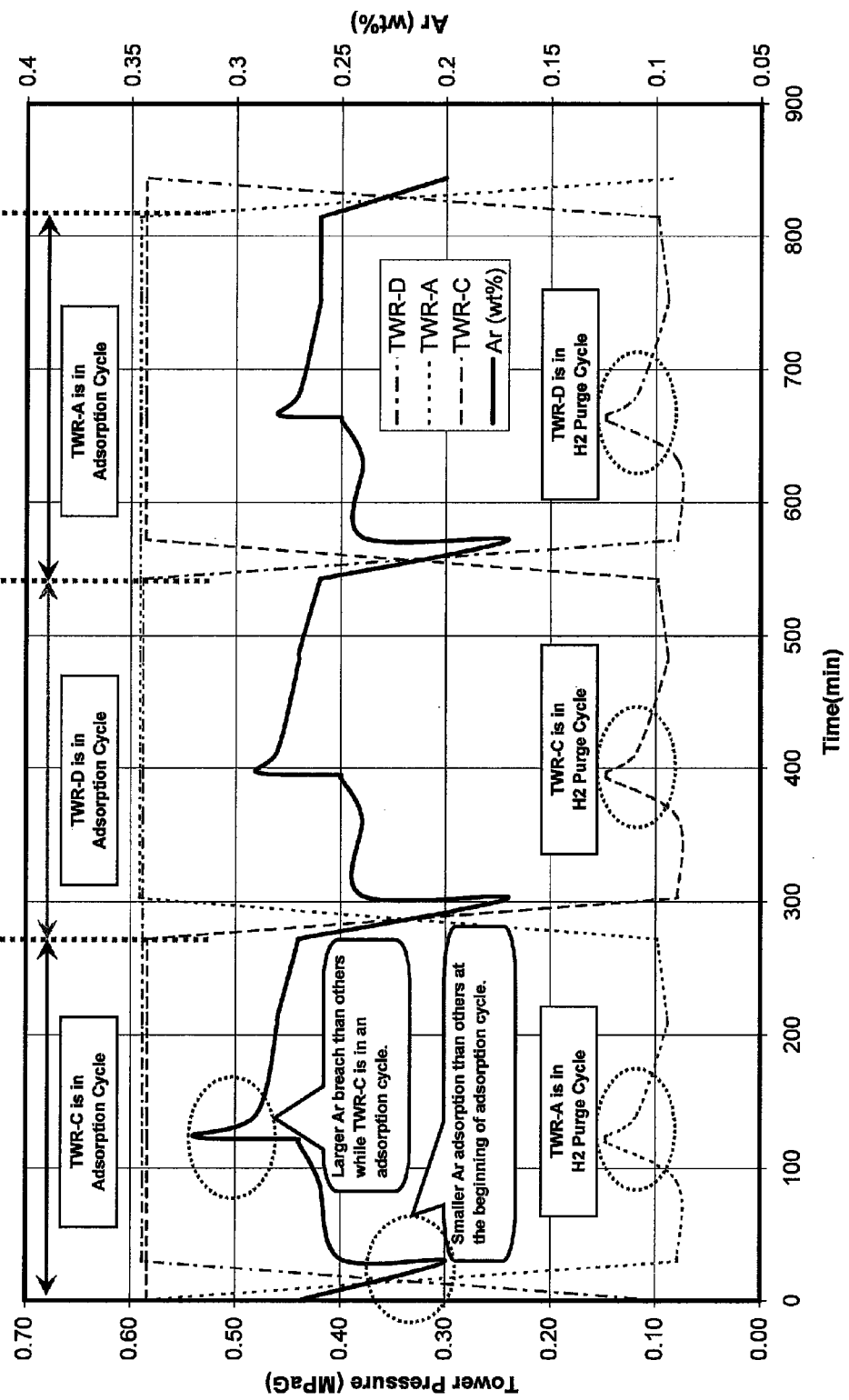

APPARATUS AND METHOD FOR PRODUCING PURIFIED HYDROGEN GAS BY A PRESSURE SWING ADSORPTION PROCESSES

BACKGROUND OF THE INVENTION

1. Field of the Invention

The present invention relates to an apparatus and method for producing purified hydrogen gas by a pressure swing adsorption process. More specifically, the present invention relates to detecting an operating life of adsorbents.

2. Description of Related Art

Pressure swing adsorption (PSA) processes are used for purifying hydrogen gas. In PSA processes, hydrogen gas included with impurity gases is fed to an adsorption tower filled with an adsorbent and the hydrogen gas passes through the adsorbent at a high pressure, while impurity gases, for example, $N_2$, Ar, $CH_4$ and chlrosilanes (dichlorosilane (abbreviated "DCS"), trichlorosilane, tetrachlorosilane (abbreviated "STC"), etc), are adsorbed by the adsorbent at high pressure. After a predetermined time has passed, a feed of unpurified hydrogen gas is turned off. The adsorption tower is depressurized by typically one or more steps, while a purified hydrogen gas is discharged from the adsorption tower. After that, the adsorbent is regenerated by depressurizing and purging with pure hydrogen gas and by heating up the adsorbent. A purified hydrogen gas is produced by repeating these steps, as described in U.S. Pat. No. 6,261,343 B1. Industrially, the PSA process includes multiple adsorption towers, with each tower connected to on-off valves and constantly produces a purified hydrogen gas, as in U.S. Publication No. 2007/0204748 A1.

Over time, the adsorption capacity of the adsorbents is reduced by repeating the PSA process. Finally, before the adsorbents are regenerated, impurities pass through the adsorbents without being adsorbed. This is know as the "breach" phenomenon.

PSA processes are used in many industry fields. Especially, the polycrystalline silicon manufacturing industry commonly uses PSA processes. Polycrystalline silicon is produced by feeding trichlorosilane ($SiHCl_3$, abbreviated "TCS") gas and purified hydrogen gas onto a surface of silicon seed rods at a high temperature in a reactor. This method is known as the Siemens method and is shown by following main reaction formulas:

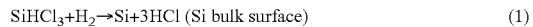

$$SiHCl_3 + H_2 \rightarrow Si + 3HCl \text{ (Si bulk surface)} \quad (1)$$

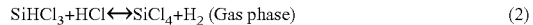

$$SiHCl_3 + HCl \leftrightarrow SiCl_4 + H_2 \text{ (Gas phase)} \quad (2)$$

In this method, exhausted gas from the reactor includes unreacted hydrogen gas. The unreacted hydrogen gas is purified by the PSA process and the purified hydrogen gas is reused as raw material gas for producing polycrystalline silicon.

In the polycrystalline silicon producing process, impurities are strictly controlled. It is important to detect an operating life of the adsorbents before a breach is caused. As a method for detecting a breach, Japan Publication Application Nos. S63-144110, H07-277720, and 2001-58118 propose methods in which a content of hydrogen chloride in the purified hydrogen is measured. But, lately, a method that more accurately detects impurity breach and an operating life of the adsorbents is needed.

One object of this present invention is to provide an apparatus and a method for detecting the operating life of adsorbents. Another object of this present invention is to provide an apparatus and a method for purifying a hydrogen gas for a polycrystalline silicon producing processes.

SUMMARY OF THE INVENTION

The present invention relates to an apparatus for producing purified hydrogen gas by a pressure swing adsorption process, the apparatus having: (A) a gas supply unit for adding an inert gas to an unpurified hydrogen gas; (B) an adsorption tower filled with an adsorbent for purifying unpurified hydrogen gas fed into the adsorption tower; and (C) a detector for measuring an inert gas in a purified hydrogen gas discharged from the adsorption tower.

The present invention relates to an apparatus, for producing a polycrystalline silicon, which purifies hydrogen gas discharged from a reaction of depositing polycrystalline silicon and feeds the hydrogen gas back to the reaction, the apparatus having: (A) a reactor for depositing polycrystalline silicon on silicon seed rods by reacting trichlorosilane with hydrogen gas; (B) a condenser for separating an unpurified hydrogen gas discharged from the reactor; (C) a gas supply unit for adding an inert gas to the unpurified hydrogen gas; (D) an adsorption tower filled with an adsorbent for purifying unpurified hydrogen gas fed into the adsorption tower; and (E) a detector for measuring an inert gas in a purified hydrogen gas discharged from the adsorption tower.

The present invention further relates to a method for producing purified hydrogen gas by a pressure swing adsorption process, the method having the steps of: (A) adding an inert gas to an unpurified hydrogen gas; (B) feeding the unpurified hydrogen gas into an adsorption tower and purifying by pressure swing adsorption; and (C) detecting the inert gas in the purified hydrogen gas discharged from the adsorption tower.

The present invention also relates to a method for producing polycrystalline silicon, which purifies hydrogen gas discharged from a reaction of depositing polycrystalline silicon and feeds it back to the reaction, the method having the steps of: (A) depositing polycrystalline silicon on silicon seed rods by reacting trichlorosilane with hydrogen gas in a reactor; (B) separating an unpurified hydrogen gas by condensing a discharged gas from the reactor; (C) adding an inert gas to the unpurified hydrogen gas; (D) feeding the unpurified hydrogen gas into an adsorption tower and purifying by pressure swing adsorption; and (E) detecting the inert gas in the purified hydrogen gas discharged from the adsorption tower.

The invention detects an operating life of adsorbents by using an inert or noble gas, like Ar gas, for example. Inert Ar gas is a very weak adsorption element. If the adsorbents are close to their adsorption capacity, Ar gas passes through the adsorbents and can be detected by an Ar gas detector. From a change in a pattern of content of inert gas, like Ar gas for example, it is possible to accurately decide when the adsorbents should be replaced with new ones without getting any contamination in purified $H_2$.

Especially, the invention is also suitable for the polycrystalline silicon producing process. A polycrystalline silicon producing process is required to strictly prevent contaminating impurities. In the polycrystalline silicon process, polycrystalline silicon is deposited on a silicon seed rod by reacting chlorosilane with hydrogen gas in a reactor, and unreacted hydrogen gas is separated and fed back to the reactor. Unreacted hydrogen gas needs to be purified before being fed back to the reactor. The present invention provides an apparatus and a method for detecting an operating life of adsorbents by using an inert gas, like Ar gas, for example. Ar gas does not react with chlorosilane or hydrogen gas and does not affect the depositing of polycrystalline silicon on a silicon seed rod.

Further, Ar gas does not impact on the operation of polycrystalline silicon production if the volume of Ar in purified $H_2$ is negligible.

BRIEF DESCRIPTION OF THE DRAWINGS

FIG. 3 is a chart of Ar content detected by Gas Chromatography-Thermal Conductivity Detector (GC-TCD) in a four adsorbent tower system with three operational towers and one tower off-line.

DETAILED DESCRIPTION OF THE INVENTION

Figure 1:
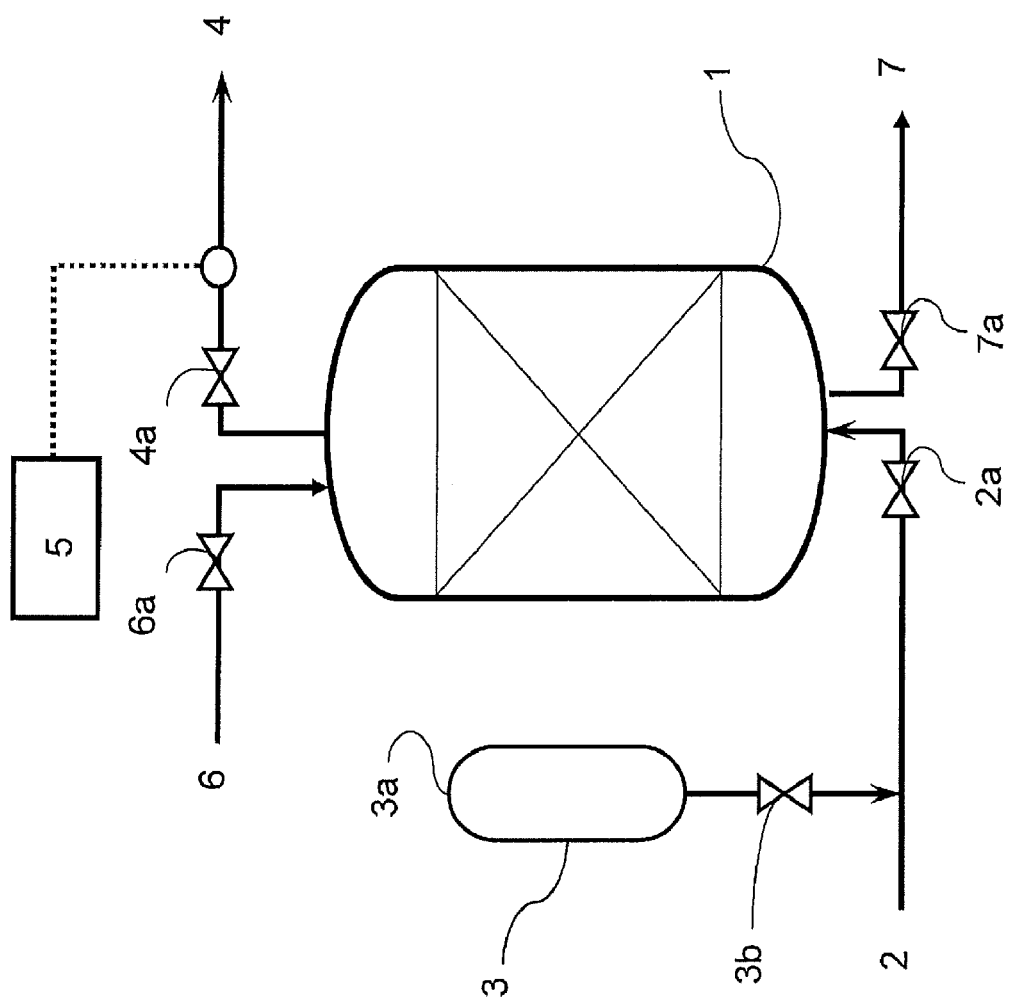
FIG. 1 is a schematic representation of the invention.

FIG. 1 is a schematic representation of an adsorption tower in a PSA apparatus according to the present invention. The PSA apparatus comprises an inert gas supplying unit 3, an adsorption tower 1 filled with an adsorbent or adsorbents and an inert gas, like Ar gas, detector 5. The inert gas supply unit 3 consists of a compressed inert gas cylinder 3a, filled with an inert gas like, Ar gas for example, and a flow regulating valve 3b. The inert or Ar gas supply unit 3 is connected to an $H_2$ feeding pipe or line 2.

The adsorption tower 1 has a plurality of adsorbent beds, typically 4, 10 or 12 beds. Zeolite, activated carbon and carbon molecular sieves, etc., are used as adsorbents. The adsorption tower 1 is connected to the $H_2$ feeding line 2 and a regeneration discharging line 7 at the bottom thereof, and is connected to a purified $H_2$ discharging line 4 and a regeneration gas feeding line 6 at the top thereof. The adsorbent beds are commonly divided into three zones for adsorbing different weights of impurities. A lower zone commonly adsorbs heavy weight impurities like STC or TCS; an intermediate zone adsorbs intermediate weight impurities like $SiH_3Cl$, $SiH_4$, $PH_3$, or $AsH_3$; and an upper zone adsorbs light weight impurities like $N_2$ or Ar.

The inert gas detector, in this case the Ar detector 5, for example, is provided in the purified $H_2$ discharging line 4. A GC-TCD, density meter or thermal conductivity gas analyzer, etc., is used as the Ar detector 5.

The PSA apparatus of present invention works in the following way. While hydrogen gas is being purified, feeding $H_2$ line valve 2a and purified $H_2$ discharging line valve 4a are open and the regenerated gas feeding valve 6a and the regenerated gas discharging line valve 7a are closed, so that unpurified hydrogen gas is continuously fed, for example, at about 2.41 MPa*m$^3$/s under high pressure of about 0.69 MPa, by absolute pressure, to the adsorption tower 1 and passes through adsorbent beds (not shown). Impurity compounds are adsorbed on the adsorbent beds, and the purified hydrogen gas is discharged from the adsorption tower 1 through purified $H_2$ discharging line 4.

While hydrogen gas is being purified, the flow regulating valve 3b is open and Ar gas, for example, is adding to the unpurified hydrogen gas from compressed Ar gas cylinder 3a. Ar gas is supplied, for example, at about 11.50 Pa*m$^3$/s (200 ppm(vol)), more preferable at about 8.63 Pa*m$^3$/s (150 ppm (vol)). In early stages of purifying hydrogen gas, a part of Ar gas is adsorbed in the adsorption beds. But because Ar gas is a weak adsorption element, Ar gas can pass through the adsorption beds and is detected by the Ar detector 5. Ar gas content in adsorption towers versus time is shown in FIG. 3.

In the end of the purifying step, the adsorbents become close to their adsorption capacity. After a predetermined time has passed, the feeding $H_2$ line valve 2a is closed and Ar gas stops feeding to the adsorption tower 1. Next, the purified $H_2$ discharging line valve 4a is closed and the regenerated gas discharging line valve 7a is open. Then, a pressure inside of the adsorption tower 1 is depressurized, for example, to 0.19 MPa by absolute pressure, from regenerated gas discharging line 7. So that the pressure inside of the adsorption tower 1 is depressurized, for example, from 0.69 MPa to 0.19 MPa from regenerated gas discharging line 7.

In a regenerating step, a regenerated gas feeding valve 6a is open and a purge gas is fed into the adsorption tower 1. In this invention, hydrogen gas is used as purge gas. After that, the regenerated gas discharging line valve 7a is closed and a pressure inside of the adsorption tower 1 is increased, for example, up to 0.69 MPa by absolute pressure.

These adsorption, depressurization and regeneration steps are repeated, and purified hydrogen gas is continuously made in the PSA process steps. If the adsorbents are close to an end of their operating life by the repetition of these PSA process steps, the Ar content chart of Ar gas to adsorption tower pressure changes to different curves. Especially, in the early step of adsorption, if Ar content is increased, it is a signal that the adsorbents are close to the capacity of adsorption. The adsorbents can be replaced before the purified hydrogen gas is contaminated by impurities.

Figure 2:
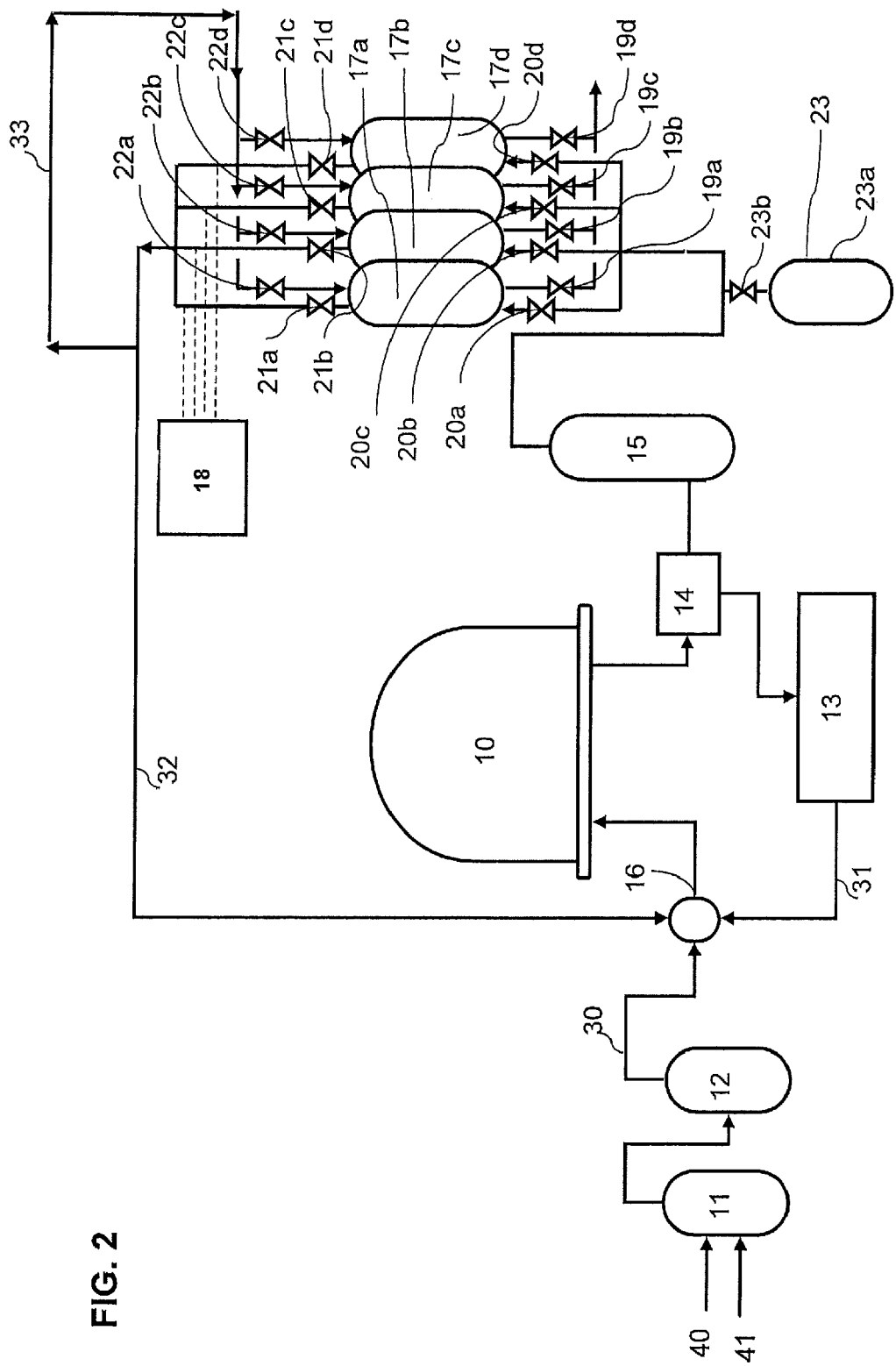
FIG. 2 is an illustration of the polycrystalline silicon producing process of the invention.

FIG. 2 is an illustration of polycrystalline silicon producing process adapting the PSA process in the purified hydrogen producing step. This polycrystalline silicon producing process comprises a fluidized bed chlorinator 11, a distillation series 12 comprising a plurality of distillation towers, a vaporizer 16, a polycrystalline silicon reactor 10, a condenser 14, and a distillation tower 13.

TCS is produced in the fluidized bed chlorinator 11 by reacting metallurgical grade silicon powder (abbreviated "Me-Si") of about 98% purity fed via line 40 with a hydrogen chloride gas (HCl) fed via line 41. The TCS is purified in the distillation series 12 and a vapor fraction of the distillation, as the purified TCS, is fed to the vaporizer 16 via feed line 30. In the vaporizer 16, the purified TCS is vaporized and mixed with $H_2$ and the mixed gas is fed to the polycrystalline silicon reactor 10 as raw material gases. The polycrystalline silicon reactor 10 has a plurality of polycrystalline silicon seed rods (not shown). The silicon seed rods are heated and the purified TCS and $H_2$ are fed into the reactor 10. Polycrystalline silicon is deposited on the silicon seed rods. Exhaust gases from the reaction include unreacted TCS, unreacted $H_2$, HCl, STC ($SiCl_4$), DCS ($SiH_2Cl_2$) and other chlorosilanes. The exhaust gases are fed to the condenser 14 and chlorosilane groups, such as TCS, STC, DCS and other chlorosilanes are condensed, so that they are separated from the gases including $H_2$ and HCl in the condenser 14. The condensed chlorosilane groups are fed to the distillation tower 13 and TCS is separated and is purified in the distillation tower 13. The purified TCS in the distillation tower 13 is fed to the vaporizer 16 via feed line 31 and is reused as raw material gas.

The gases separated in the condenser 14, including $H_2$ and HCl, are fed to a HCl adsorbing tower 15. In the HCl adsorbing tower 15, most of HCl is adsorbed and other gases are fed to adsorption towers 17a, b, c and d (abbreviated "adsorption towers 17"). An inert gas, like Ar gas, supply unit 23 is located between the HCl adsorption tower 15 and the adsorption towers 17. However, the Ar supply unit 23 is able to be located upstream of the HCl adsorbing tower 15, as well. The Ar supply unit 23 consist of a compressed Ar cylinder 23a and a flow regulating valve 23b. The gases discharged from the HCl adsorbing tower 15 comprise, for example, approximately 83.59% $H_2$, 0.16% HCl, 12.95% TCS, 0.07% STC, 3.23% DCS, by weight. The Ar supply unit 23 supplies Ar gas to the gases not less than about 0.05%, and not more than about 0.50% by weight, for example. More preferably, Ar gas is supplied to the gases between about 0.25% and about 0.35% by weight, for example.

The adsorption towers 17 are filled with an adsorbent, like activated carbon (not shown), for example. In this embodiment, four adsorption towers 17a, b, c and d are arranged in a row. Each adsorption tower has valves 19, 20, 21 and 22, respectively indicated a, b, c and d for each respective adsorption tower 17a, b, c and d, in the inlet and the outlet of the tower thereof. Each adsorption tower is operated on a different adsorption step from each other by controlling the valves 19, 20, 21 and 22. For example, when the adsorption tower 17a is on the adsorption step, the gases from the HCl adsorption tower 15 pass through the adsorption tower 17a by opening the valves 20a and 21a and closing the valves 19a and 22a. While the gases pass through the adsorption tower 17a, impurities, such as HCl, TCS, STC, DCS and other chlorosilanes are trapped by the activated carbon at around the bottom bed, and hydrogen is purified in the adsorption tower 17a. The adsorption tower 17b is depressurized by opening the valve 19b and closing the valves 22b, 20b, and 21b, then purging is started with purified $H_2$ in tower 17b by opening valve 22b for regeneration, while the adsorption tower 17a is on the adsorption step. Regeneration gas from tower 17b through valve 19b is recycled after purified by another adsorption tower, and returned back (not shown) to the inlet of the HCl adsorption tower 15. At the same time, the adsorption tower 17c is pressurized by opening the valve 22c and closing the valves 19c, 21c and 20c, and the adsorption tower 17d is off-line in a wait step (stand-by) by opening valve 21d and closing valves 19d, 20d and 22d. An example of such a four adsorption tower system is show in FIG. 3. Valves 19, 20, 21 and 22 can be controlled, as explained above, to produce the gas flow, cycle timing, and Ar content as shown in FIG. 3.

The purified hydrogen, which passed through the adsorption towers 17, is fed to the vaporizer 16 via a feed line 32 and is reused as raw material. Some of the purified hydrogen is returned back to the adsorption towers 17 from feed line 32 via a return line 33 for the regeneration of the adsorption towers 17. Purity of the purified hydrogen is 99.7% and Ar content is 0.3% by weight, for example.

Inert gas detectors, in this case Ar gas detectors 18, for detecting Ar gas discharged from the adsorption towers 17, are provided downstream of the adsorption towers 17. In this embodiment, GC-TCD is used as the Ar detector 18.

A working example of the above system is shown in FIG. 3. FIG. 3 shows a graph of tower pressure (MPaG) of three adsorption towers (abbreviated "TWR") A, C and D and Ar gas weight content (wt %) versus time (minutes) in a four consecutive tower operation, with tower B in off-line, standby mode. Each tower operates in different cycles, adsorption, depressurization and regeneration, at different times. Chronologically in FIG. 3, Ar gas content varies in each tower over time. For example, in TWR-C, a smaller Ar adsorption than in other towers is observed at the beginning of the adsorption cycle by a decrease to 0.2 wt %, followed by a larger Ar gas breach than in other towers shown by the peak in Ar wt % at above 0.3 wt %. The maximum weight percent of Ar in the next tower, TWR-D, is less than TWR-C and more than the last tower, TWR-A. At maximum Ar breach, TWR-C and TWR-D are in the adsorption cycles, while TWR-A is in a $H_2$ purge cycle. At the next highest wt % of Ar observed in TWR-D, both TWR-D and TWR-A are in adsorption cycles, while TWR-C is in the $H_2$ purge cycle. Finally, at the lowest wt % amount of Ar, TWR-C and TWR-A are in the adsorption cycle while TWR-D is in the $H_2$ purge cycle.

The data of FIG. 3 is shown below in Table 1:

TABLE 1

| Time Minutes | TWR-D MPaG | TWR-C MPaG | TWR-A MPaG | Ar wt % |
|---|---|---|---|---|
| 0 | 0.09 | 0.58 | 0.59 | 0.27 |
| 30 | 0.59 | 0.58 | 0.08 | 0.2 |
| 32 | 0.59 | 0.58 | 0.08 | 0.25 |
| 90 | 0.59 | 0.58 | 0.08 | 0.26 |
| 120 | 0.59 | 0.58 | 0.15 | 0.27 |
| 122 | 0.59 | 0.58 | 0.15 | 0.27 |
| 124 | 0.59 | 0.58 | 0.15 | 0.32 |
| 140 | 0.59 | 0.58 | 0.12 | 0.29 |
| 208 | 0.59 | 0.58 | 0.09 | 0.28 |
| 210 | 0.59 | 0.58 | 0.09 | 0.28 |
| 212 | 0.59 | 0.58 | 0.09 | 0.28 |
| 272 | 0.59 | 0.58 | 0.10 | 0.27 |
| 303 | 0.59 | 0.08 | 0.59 | 0.17 |
| 305 | 0.59 | 0.08 | 0.59 | 0.24 |
| 363 | 0.59 | 0.08 | 0.59 | 0.24 |
| 393 | 0.59 | 0.15 | 0.59 | 0.25 |
| 395 | 0.59 | 0.15 | 0.59 | 0.25 |
| 397 | 0.59 | 0.15 | 0.59 | 0.29 |
| 413 | 0.59 | 0.12 | 0.59 | 0.28 |
| 481 | 0.59 | 0.09 | 0.59 | 0.27 |
| 485 | 0.59 | 0.09 | 0.59 | 0.27 |
| 487 | 0.59 | 0.09 | 0.59 | 0.27 |
| 542 | 0.59 | 0.10 | 0.59 | 0.26 |
| 572 | 0.08 | 0.59 | 0.59 | 0.17 |
| 574 | 0.08 | 0.59 | 0.59 | 0.24 |
| 632 | 0.08 | 0.59 | 0.59 | 0.24 |
| 662 | 0.15 | 0.59 | 0.59 | 0.25 |
| 664 | 0.15 | 0.59 | 0.59 | 0.25 |
| 666 | 0.15 | 0.59 | 0.59 | 0.28 |
| 682 | 0.12 | 0.59 | 0.59 | 0.27 |
| 750 | 0.09 | 0.59 | 0.59 | 0.26 |
| 754 | 0.09 | 0.59 | 0.59 | 0.26 |
| 756 | 0.09 | 0.59 | 0.59 | 0.26 |
| 814 | 0.10 | 0.59 | 0.59 | 0.26 |
| 844 | 0.59 | 0.59 | 0.08 | 0.2 |

The adsorption cycle is repeated in the order of TWR-C, TWR-D and TWR-A. Smaller amounts of Ar gas adsorption and larger amounts of Ar gas breach are indications of adsorbent carbon deterioration. In the graph, Ar content changes as shown by the two inflections and two plateaus per tower in the Ar curve in FIG. 3. The first plateau is stable due to the recycled regeneration gas which contains higher amounts Ar gas. The second plateau is stable due to the saturation of breached Ar gas. At close to the adsorption capacity of adsorbent, the Ar gas content of TWR-C shows a higher amount of Ar gas breach. FIG. 3 shows a large Ar gas breach at 0.32 wt %. This is a signal to replace the adsorbent to new adsorbent.

At the minimum, at least two carbon towers are necessary in order to operate pressure swing adsorption systems.

The embodiments and examples are described for illustrative, but not limitative purposes. It is to be understood that changes and/or modifications can be made by those skilled in the art without for this departing from the related scope of protection, as defined by the enclosed claims.

What is claimed is:

1. A method for producing purified hydrogen gas by a pressure swing adsorption processes, comprising:
    adding an inert gas to an unpurified hydrogen gas;
    feeding the unpurified hydrogen gas into an adsorption tower and purifying by pressure swing adsorption; and
    detecting the inert gas in the purified hydrogen gas discharged from the adsorption tower.

2. The method according to claim 1, wherein the inert gas is Ar gas.

3. The method according to claim 2, wherein Ar gas is detected in the range of about 0.15 to 0.35 wt %.

4. The method according to claim 2, wherein Ar gas is detected under an adsorption tower pressure range of about 0.59 to 0.76 MPaG.

5. A method for producing polycrystalline silicon, which purifies hydrogen gas discharged from a reaction of depositing polycrystalline silicon and feeds the hydrogen gas back to the reaction, comprising:
   depositing polycrystalline silicon on silicon seed rods by reacting trichlorosilane with hydrogen gas in a reactor;
   separating an unpurified hydrogen gas by condensing a discharged gas from the reactor;
   adding an inert gas to the unpurified hydrogen gas;
   feeding the unpurified hydrogen gas into an adsorption tower and purifying by pressure swing adsorption; and
   detecting the inert gas in the purified hydrogen gas discharged from the adsorption tower.

6. The method of claim 5, further comprising returning some of the discharged purified hydrogen gas back to the adsorption tower for regenerating the adsorption tower.

7. The method according to claim 5, wherein the inert gas is Ar gas.

8. The method according to claim 7, wherein Ar gas is detected in the range of about 0.15 to 0.35 wt %.

9. The method according to claim 7, wherein Ar gas is detected under an adsorption tower pressure range of about 0.59 to 0.76 MPaG.

* * * * *